(12) United States Patent
Tamaru

(10) Patent No.: US 7,719,727 B2
(45) Date of Patent: May 18, 2010

(54) IMAGE REPRODUCING APPARATUS FOR PREVENTING WHITE BALANCE OFFSET AND SOLID-STATE IMAGING APPARATUS

(75) Inventor: Masaya Tamaru, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1805 days.

(21) Appl. No.: 10/820,032

(22) Filed: Apr. 8, 2004

(65) Prior Publication Data

US 2004/0201728 A1    Oct. 14, 2004

(30) Foreign Application Priority Data

Apr. 11, 2003   (JP)   ............... 2003-108139

(51) Int. Cl.
*H04N 1/04*   (2006.01)
(52) U.S. Cl. .................. 358/474; 358/516; 358/518; 358/520; 358/471; 358/483; 382/166; 382/162; 348/223.19; 348/207.99
(58) Field of Classification Search ................ 358/512, 358/513, 516, 518, 520, 525, 530, 448, 471, 358/474, 482, 483, 906, 909.1, 1.9, 1.18, 358/539, 2.1; 382/166, 167, 162; 348/345, 348/223.1, 207.99
See application file for complete search history.

(56) References Cited

U.S. PATENT DOCUMENTS

| | | | | |
|---|---|---|---|---|
| 5,911,003 | A * | 6/1999 | Sones | 382/162 |
| 6,357,658 | B1 * | 3/2002 | Garczynski et al. | 235/462.01 |
| 7,034,959 | B1 * | 4/2006 | Takemoto | 358/1.9 |
| 7,081,918 | B2 * | 7/2006 | Takemoto | 348/223.1 |
| 7,098,944 | B1 * | 8/2006 | Shiraiwa et al. | 348/222.1 |
| 7,099,044 | B2 * | 8/2006 | Sawada et al. | 358/1.9 |
| 7,126,718 | B1 * | 10/2006 | Newman et al. | 358/1.9 |
| 7,158,144 | B2 * | 1/2007 | Shiraiwa et al. | 345/589 |
| 7,158,673 | B2 * | 1/2007 | Nakabayashi et al. | 382/167 |
| 7,181,091 | B2 * | 2/2007 | Yoda | 382/309 |
| 7,193,746 | B2 * | 3/2007 | Kanai | 358/1.9 |
| 7,304,766 | B2 * | 12/2007 | Zeng | 358/1.9 |
| 7,369,284 | B1 * | 5/2008 | Inuzuka et al. | 358/512 |
| 7,426,061 | B2 * | 9/2008 | Mimamino | 358/1.9 |
| 7,636,473 | B2 * | 12/2009 | Imai et al. | 382/167 |
| 2002/0168103 | A1 * | 11/2002 | Shiraiwa | 382/167 |
| 2003/0043290 | A1 * | 3/2003 | Sasaki | 348/345 |
| 2004/0017594 | A1 * | 1/2004 | Suekane et al. | 358/516 |
| 2005/0047771 | A1 * | 3/2005 | Yuyama | 396/155 |
| 2006/0012808 | A1 * | 1/2006 | Mizukura et al. | 358/1.9 |

FOREIGN PATENT DOCUMENTS

JP   7-231418   8/1995

* cited by examiner

*Primary Examiner*—Negussie Worku
(74) *Attorney, Agent, or Firm*—McGinn IP Law Group, PLLC

(57) ABSTRACT

A digital camera supplies raw pixel data in a raw data mode to a digital processor. In the digital processor, a white balance decision circuit determines a white balance gain as color temperature information. The digital processor outputs the image data and the white balance gain thus determined over data bus to an interface unit. The linear matrix coefficients, supplied from a system controller, are sent over the data bus to the interface unit, which interfaces the data in accordance with a recording format, according to which the three sorts of data are recorded in a storage unit responsive to a control signal.

18 Claims, 6 Drawing Sheets

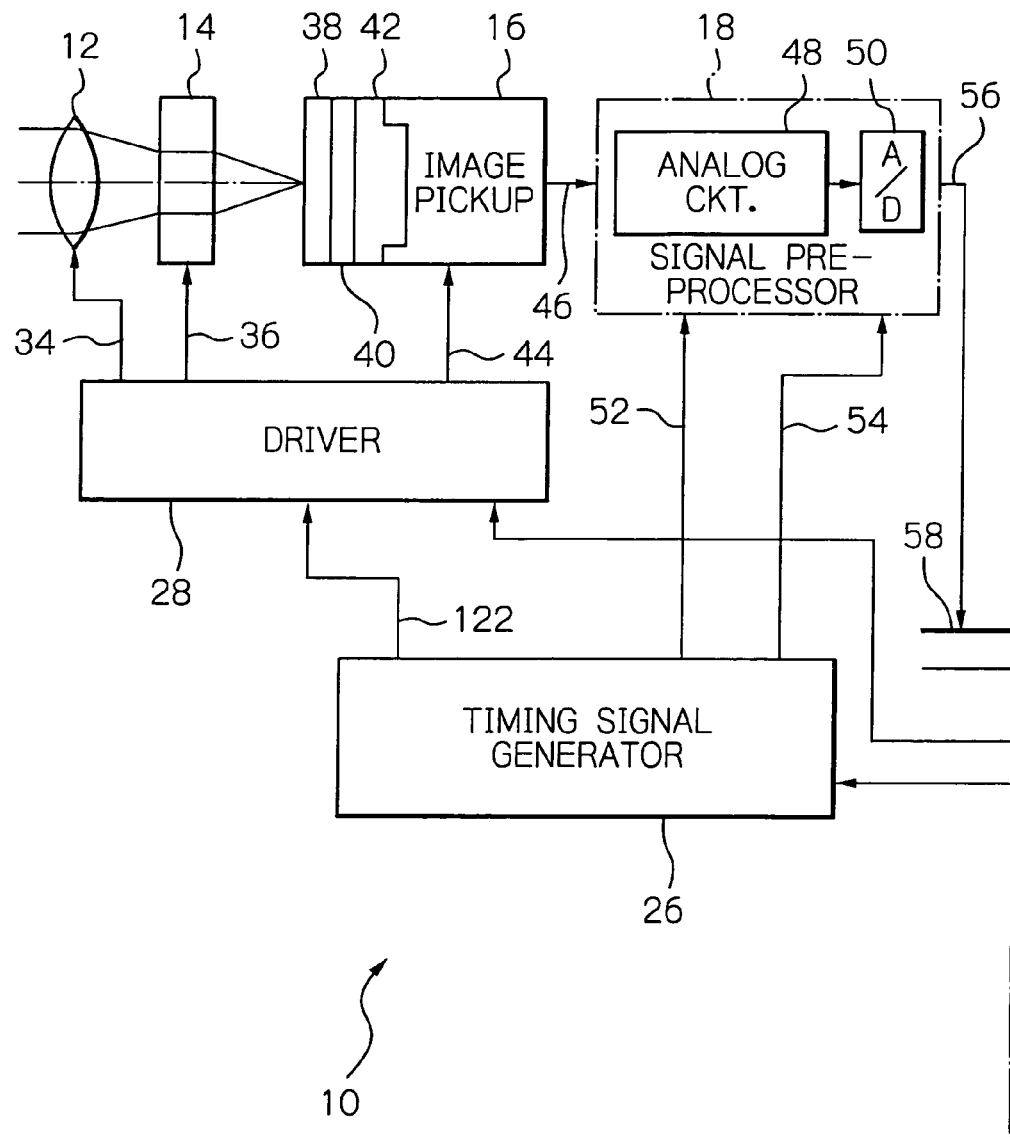

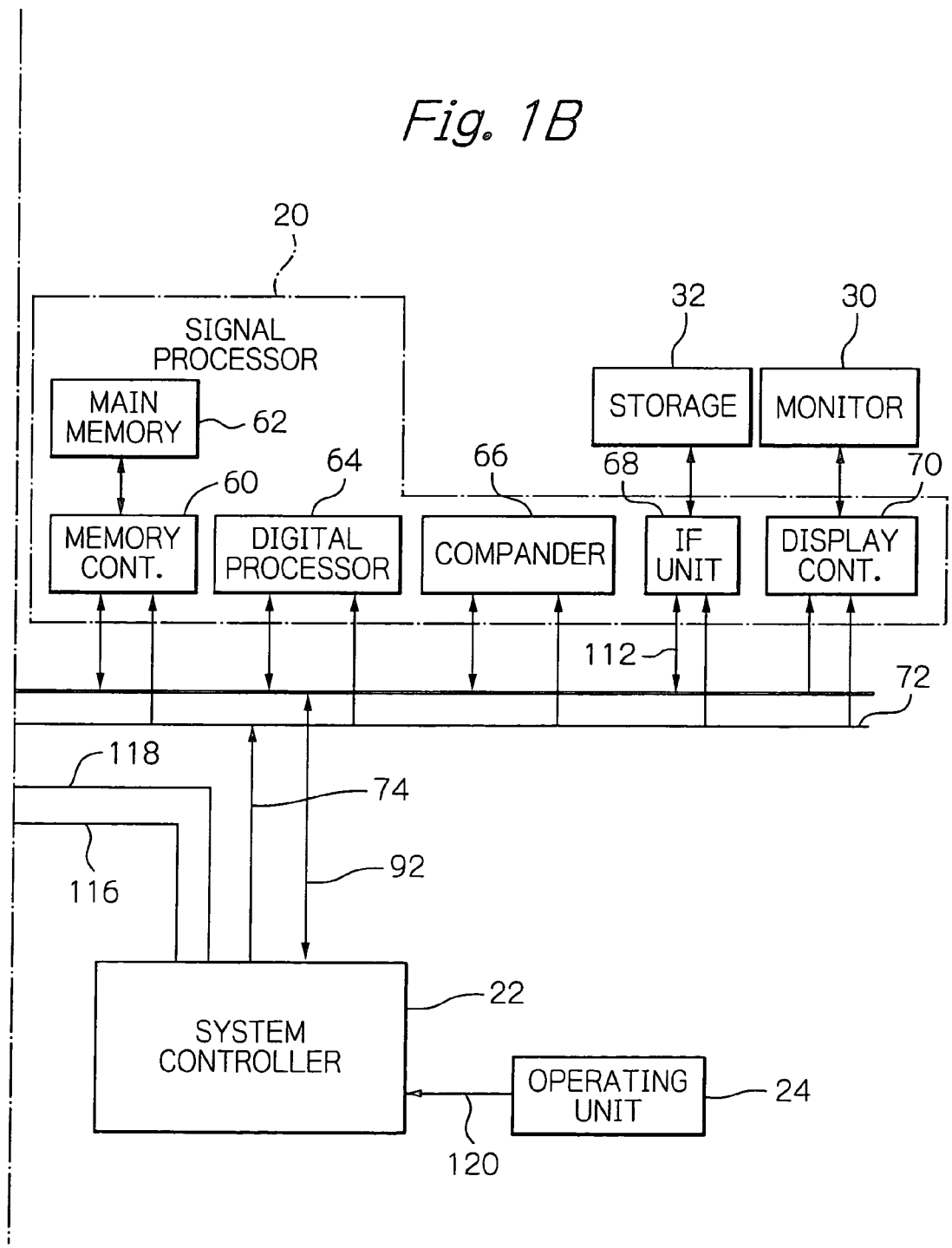

IMAGE REPRODUCING APPARATUS FOR PREVENTING WHITE BALANCE OFFSET AND SOLID-STATE IMAGING APPARATUS

BACKGROUND OF THE INVENTION

1. Field of the Invention

The invention relates to an image reproducing apparatus and, in particular, to an image reproducing apparatus that may be applied with advantage to image data in which the setting in the color space differs between imaging and reproducing. The invention also relates to a solid-state imaging apparatus that may be used with advantage in an image input apparatus having a mode of recording a digital form of raw pixel data. The invention further relates to a solid-state imaging system applicable with advantage to a digital camera in which raw pixel data are recorded as image data in a set color space and reproduced in a desired color space.

2. Description of the Background Art

The image input apparatus, such as a digital camera, may be of the type of recording image data with or without being signal-processed. Specially, with the type of recording image signals without being processed, raw pixel data are directly recorded as image data. In the latter case, for example, a personal computer operating as a reproducing apparatus runs application software to reproduce an image or picture from the raw pixel data directly recorded.

In this image generating method, white balance adjustment is critical in applying proper image processing on the raw data. There are manual and automatic methods of white balance adjustment: With the manual method, one manually adjusts the white balance of image data while viewing a pre-view picture displayed on a monitor screen of a reproducing apparatus. With the automatic method, the white balance is adjusted based on white balance information obtained when imaging a scene. The white balance information may be obtained in the automatic or in user setting mode of photographing.

In the Japanese Patent Laid-Open Publication No. 231418/1995, a still picture processing apparatus is described which records iris information set on the camera and color temperature information determined by the camera at the time of imaging, along with the raw pixel data, for transmitting the information to the reproducing apparatus. The iris and color temperature information is recorded as supplementary information to pixel data. The still picture processing apparatus reads out, when reproducing an image captured by a digital camera, the color temperature (white balance) information as well as the pixel data of the image and adjusts the white balance of the captured image to restore the picture in the conditions when captured.

Currently, with the digital camera, the raw pixel data recording is merely one of the recording modes or systems. In this perspective, it is now required to form a complete image by a digital camera per se, even with a digital camera having the raw data mode of recording raw pixel data. In order to meet this requirement, the digital camera is designed so that an image of the optimum color space will be produced on the digital camera itself. The digital camera is adapted to determine an optimized white balance in the color space.

The reproducing apparatus may often, when reproducing an image captured based on the raw pixel data, the iris information and the color temperature information thereof, form an image having its white balance set off. This occurs when the color space of the reproducing apparatus differs from the optimum color space set on the camera. The reproducing apparatus may often be provided with the function of freely adjusting the color space to suit to the user's demand. When the reproducing apparatus reproduces an image in an optional color space thus adjustably set, the white balance is caused to shift from its proper value to be merely poor, because the color temperature information set is optimized only to the color space of the camera.

SUMMARY OF THE INVENTION

It is an object of the present invention to provide an image reproducing apparatus by which an image may be reproduced with account taken of not only the color temperature information but also the color space information obtained at the time of imaging.

It is another object of the present invention to provide a solid-state imaging apparatus by which it is possible to record not only the color temperature information but also the color space information obtained at the time of the imaging.

It is yet another object of the present invention to provide a solid-state imaging system by which it is possible to record not only the color temperature information but also the color space information obtained at the time of the imaging, and which allows a picture to be reproduced with account taken of the color space information obtained at the time of imaging.

For accomplishing the above object, the present invention provides an image reproducing apparatus for reproducing image data formed by imaging an object, which comprises a reader for reading out image data, first color space information represented by a plurality of coefficients converting the image data in a color space set when imaging the object and color temperature information optimum for the color space information, a first color space corrector for correcting the image data based on the first color space information, a color temperature adjuster for correcting the image data corrected by the first color space corrector based on the color temperature information, and a second color space corrector for correcting the image data adjusted by the color temperature adjuster based on second color space information represented by a plurality of coefficients converting the image data to a color space set in the apparatus.

In according with the image reproducing apparatus, the first color space information and the color temperature information, recorded along with the image data, are read out by the reader, the first color space information is sent to the first color space corrector to set the image data to the color space when imaging the object, the color temperature for the image data of the color space set at the time of imaging the object is corrected, based on the color temperature information supplied to the color temperature adjuster, and the color space of the corrected image data is converted by the second color space corrector to render the white balance offset of the reproduced image difficult to occur.

For accomplishing the above object, the present invention also provides a solid-state imaging apparatus comprising an image pickup device including an array of photosensitive cells for transducing incident light from an object field into an electrical image signal, the apparatus having a raw data mode for recording the image signal in a form of digitized, raw pixel data, an adjustment decision circuit for adjusting color temperature in the image data, based on the image data, determining whether or not adjustment of the color temperature is optimum, and outputting gain adjustment information reflecting the color temperature resultant from determination, a recording adjuster for adjusting the raw pixel data as well as color space information including a plurality of coefficients for converting the raw pixel data to a color space used in imaging the object field and the gain adjustment information to a predetermined recording form, and a system controller for controlling the adjustment decision circuit and the recording adjuster.

In according with the solid-state imaging apparatus of the present invention, the adjustment decision circuit and the recording adjuster are controlled by the system controller, the gain adjustment information is obtained by the adjustment decision circuit and sent to the recording adjuster, which records the raw pixel data, gain adjustment information and the color space information set at the time of imaging the object field by the recording adjuster, in the raw data mode, whereby the color space information may be furnished at the time of reproduction as the information indicating the relation between the raw pixel data with the color space information not set and the gain adjustment information obtained based on the color space information set at the time of imaging the object field.

For accomplishing the above object, the present invention also provides a solid-state imaging system in which incident light from an object field is transduced by an image pickup device including an array of photosensitive cells into an electrical image signal, and in a raw data mode the image signal is recorded in a form of digitized, raw pixel data. The system comprises an adjustment decision circuit for adjusting color temperature in the image data, based on the image data, determining whether or not adjustment of the color temperature is optimum, and outputting gain adjustment information reflecting the color temperature resultant from determination, writer/reader for adjusting the raw pixel data as well as first color space information including a plurality of coefficients for converting the raw pixel data to a color space used in imaging the object field and the gain adjustment information to a predetermined recording form, and for recording and reproducing the raw pixel data, the first color space information and the gain adjustment information, a first color space corrector for correcting the image data based on the first color space information, a color temperature adjuster for adjusting the image data corrected by the first color space corrector based on the gain adjustment information, a second color space corrector for correcting the image data adjusted by the color temperature adjuster based on second color space information represented by a plurality of coefficients converting the image data to a color space set in the system, and a system controller for controlling the adjustment decision circuit, the writer/reader, the color temperature adjuster and the first and second color space correctors.

In according with the solid-state imaging system of the present invention, the objects to be controlled are operative under the control of the system controller, and the gain adjustment information is obtained by the adjustment decision circuit and sent to the writer/reader. The reader/writer records the raw pixel data, gain adjustment information and color space information set at the time of imaging a scene in the raw data mode. The color space information may therefore be presented at the time of reproduction as information representing the relation between the raw pixel data with the color space information not set. The gain adjustment information obtained is based on the color space information set at the time of imaging the scene. The first color space information and the color temperature information are read out in reproduction through the writer/reader. The first color space information is supplied to the first color space corrector to set the image data to the color space when imaging the scene. The color temperature of the image data in the color space set at the time of imaging the scene is corrected based on the color temperature information supplied to the color temperature adjuster. The thus corrected image data are corrected in color space by the second color space corrector based on the second color space information to render the white balance offset less liable to occur in the reproduced picture.

In the image reproducing apparatus of the present invention, the image data recorded in the raw data mode, i.e. in the form of image data not signal-processed, color temperature information and first color space information, are read out by the reader. The image data read out are corrected by the first color space corrector in respect of the color space matching with the setting at the time of imaging a scene in accordance with the first color space information. The resulting data are corrected in gain, based on the color temperature, by the color temperature adjuster, and the supplied image data are adjusted in white balance. The image data adjusted in white balance are corrected by the second color space corrector in accordance with the second color space information to the color space desired by the user. In this manner, the image corrected to a desired color space is less liable to undergo white balance offset to enable an optimum image to be produced.

In the solid-state imaging apparatus of the present invention, the gain adjustment information in the form of color temperature information is obtained by the adjustment decision circuit, and the raw pixel data, gain adjustment information and color space information set when imaging a scene are recorded in the raw data mode, so that white balance may be positively prevented from being set off from the proper white balance setting at the time of reproduction.

In the solid-state imaging system of the present invention, the objects to be controlled are operative under the control of the system controller, and the gain adjustment information is obtained by the adjustment decision circuit and sent to the writer/reader. The reader/writer records the raw pixel data, gain adjustment information and color space information set at the time of imaging a scene in the raw data mode. The color space information may therefore be presented at the time of reproduction. For reproduction, the first color space information and the color temperature information are read out by the writer/reader. The image data are corrected by the first color space corrector in the first color space. The color temperature is adjusted by the color temperature adjuster in the image data corrected to form image data which are in keeping with the color space and the color temperature information set at the time of imaging the scene. The corrected picture data are corrected in color space by the second color space corrector, based on the second color space information, to render the white balance offset unlikely to occur in a reproduced image. That assures more positive color balance of an image resultant from the image correction to a desired space than is possible with the conventional system, and the system is easier to operate.

BRIEF DESCRIPTION OF THE DRAWINGS

The objects and features of the present invention will become more apparent from consideration of the following detailed description taken in conjunction with the accompanying drawings in which:

FIG. 1 shows how to combine FIGS. 1A and 1B;

FIGS. 1A and 1B, when combined as shown in FIG. 1, are a block diagram showing the schematic configuration of an embodiment of digital camera having a solid-state imaging apparatus in accordance with the present invention;

DESCRIPTION OF THE PREFERRED EMBODIMENTS

Figure 2:
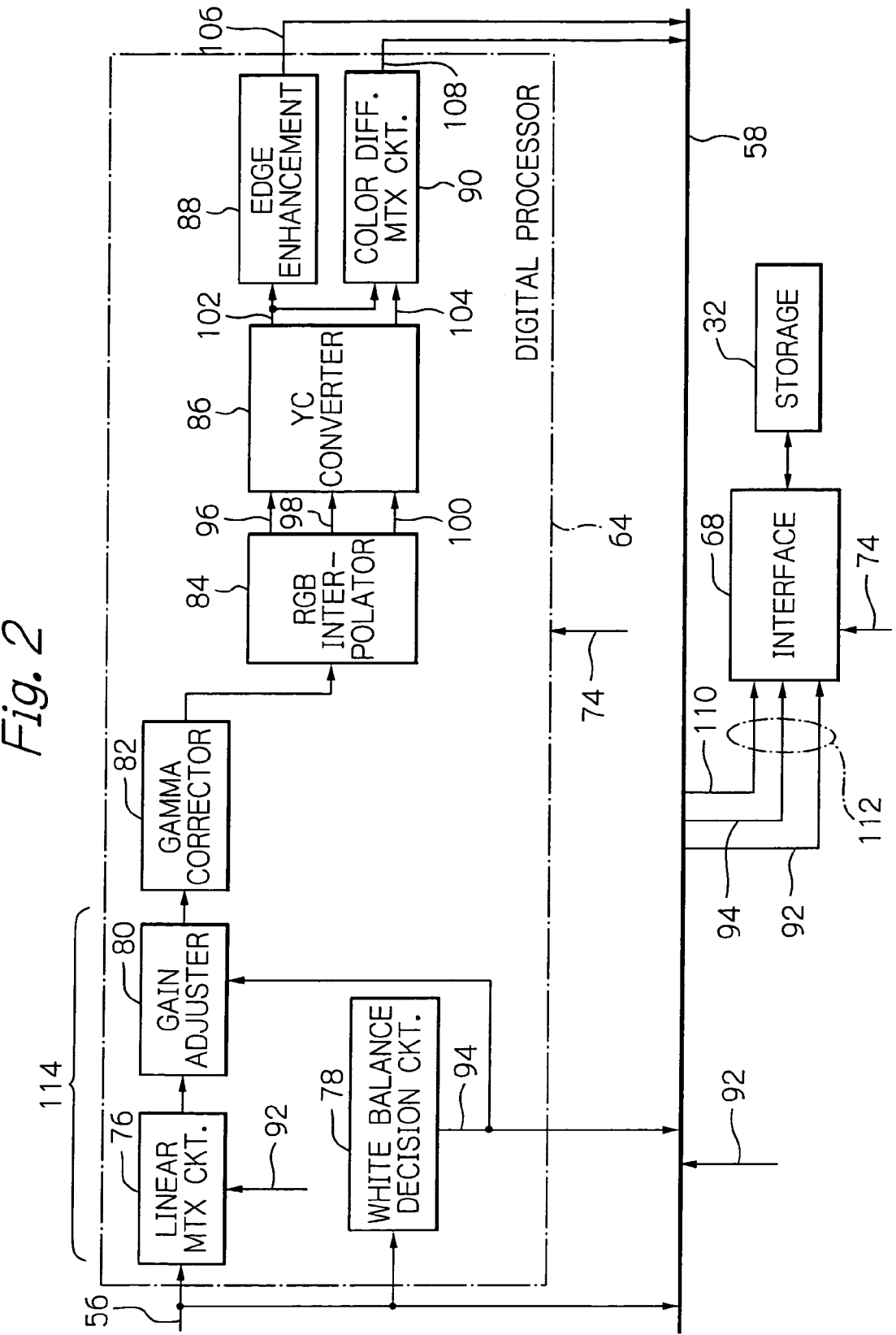
FIG. 2 is a block diagram showing a schematic configuration of a digital processor and associated with image data recording in the digital camera shown in FIG. 1.

Referring to the drawings, certain preferred embodiments of the solid-state imaging apparatus of the present invention will be described in detail. In the instant embodiment, the present invention is applied to a digital camera 10. The portions not directly relevant to understanding the present invention are neither shown nor described. In the following description, a signal is designated with the reference numeral of a connection on which the signal appears.

Referring now to FIGS. 1A and 1B, the digital camera 10 includes an optical unit 12, an iris diaphragm adjustment mechanism 14, an image pickup section 16, a pre-processor 18, a signal processor 20, a system controller 22, an operating unit or control panel 24, a timing signal generator 26, a driver 28, a display monitor 30 and a storage 32 interconnected as illustrated.

The optical unit 12 includes, along with the iris diaphragm adjustment mechanism 14, a mechanical shutter, lenses of optics, a zooming mechanism and an automatic focus (AF) adjustment mechanism, although not specifically shown. The optical unit 12 has the function of directing the incident light to the image pickup section 16 with the lenses of the optics adjusted by the components of aforementioned mechanisms.

The zooming mechanism adjusts the angle of field viewing an object field in a manner not shown. The automatic focus adjustment mechanism operates for automatically shifting the positions of plural optical lenses so as to allow the image of an object to be focused on the photosensitive array of the image sensor, not shown, included in the image pickup section 16. Those mechanisms include respective electric motors and/or actuators for causing the optical lenses to move to the focusing position thereof. These components are in operation responsive to driving signals 34 supplied from the driver 28 to the respective motors.

The iris diaphragm adjustment mechanism 14 functions as an automatic exposure (AE) adjustment for controlling the amount of the incident light, in a manner not shown in detail, and causes its ring unit to rotate in response to a driving signal 36 received from the driver 28. The ring unit, not shown, causes its blades to be partially overlapped with each other to form a substantially circular optical opening to permit the incident light beam to pass therethrough. The iris diaphragm adjustment mechanism variably thus adjusts the iris diameter. The iris diaphragm adjustment mechanism 14 may of the type having a mechanical shutter built in the lenses of the optics to form a lens shutter.

The mechanical shutter has the function of blocking the light beam so that the image pickup section 16 will not be illuminated with the light beam except during imaging, and defining the light exposure period of time from the start to the end of the light exposure. The mechanical shutter may be exemplified by a focal plane shutter such as used in a single lens reflex camera. The focal plane type of shutter has its shutter curtain travelling vertically or horizontally to form an optical slit instantly for use for light exposure. The aforementioned lens shutter system may also be used. If the mechanical shutter is provided within the iris diaphragm adjustment mechanism 14, it may open or close in response to the drive signal 36 supplied from the driver 28.

The image pickup section 16 includes an optical low-pass filter 38 and a color filter 40 arranged on the light incident side or photosensitive array, not shown. The image pickup section 16 also includes a solid-state imaging device 42 for photoelectrically transducing the incident light passing the color filter segments. The optical low-pass filter 38 serves for lowering the spatial frequency of the incident light to the Nyquist frequency or lower. The color filter 40 will be described in detail subsequently.

With the illustrative embodiment, the solid-state imaging device 42 is of the type including a charge-coupled device (CCD) having its transfer gate (TG) for reading out signal charges, stored in the CCD device, to a vertical transfer channel. The solid-state imaging device 42 is supplied with a drive signal 44 also from the driver 28. The drive signal 44 may include a horizontal and a vertical drive signal, and an overflow drain (OFD) signal supplied depending upon the operational mode of the solid-state imaging device 42. The image pickup section 16 feeds the pre-processor 18 with an analog voltage signal 46 associated with the signal charges generated by the solid-state imaging device 42. The solid-state imaging device 42 is not limited to the CCD but may be a type of complementary metal oxide semiconductor (CMOS), for example.

The color filter 40 is provided with color filter segments of, for example, three primary colors red (R), green (G) and blue (B). With the embodiment, the color filter 40 is of a single plate and the spatial frequency of each color is defined in dependence upon the pattern of arraying the color filter segments. If selected properly, the arraying pattern has the favorable effect of suppressing smear or pseudo-color otherwise caused by aliasing.

The pre-processor 18 includes an analog circuit 48 and an analog-to-digital (A/D) converter 50 interconnected as shown The analog circuit 48 includes a correlated double sampling (CDS) circuit for reducing noise and again-controlled amplifier (GCA), although not specifically shown. The CDS circuit is supplied from the timing signal generator 26 with a CDS pulse 52 as its sampling signal. The A/D converter 50 is supplied with a converter clock signal. The pre-processor 18 is adapted to process noise reduction, waveform shaping and digitization on an analog signal received to output all of the image data thus processed to the signal processor 20 over the data bus 58 in the form of digital image data 56.

The signal processor 20 includes a memory controller 60, a main memory 62, a digital processor 64, a compander 66, an interface (IF) unit 68 and a display controller 70 interconnected as illustrated. The signal processor 20 is controlled responsive to a control signal 74 supplied from the system controller 22 over a control bus 72. The memory controller 60 has the function of controlling the write-in and read-out of image data 56 to and from, and the refreshing of, the main memory 62 responsive to the control signal 74. As the main memory 62, use is made of an SRAM (static random access memory), for example.

The digital processor 64 has the function of performing plural digital processing operations on the image data 56. Referring to FIG. 2, the digital processor 64 of the present embodiment includes a linear matrix (MTX) circuit 76, a white balance decision circuit 78, a gain controller 80, a gamma corrector 82, an RGB interpolator 84, a YC converter 86, an edge enhancement circuit 88 and a color difference matrix circuit 90 interconnected as illustrated. The digital processor 64 is adapted to read out and receive image data 56, temporarily stored in the main memory 62, over data bus 58.

The linear MTX circuit 76 has the calculating function of converting the RGB color space for the supplied image data 56, based on predetermined linear matrix coefficients 92 supplied from the system controller 22. In general, manufacturers of digital cameras, for example, propose or present several types of color space. The digital camera 10 of the illustrative embodiment employs specific one of the color spaces thus proposed. The linear matrix coefficients 92 are predetermined for use in conversion to the one color space adopted by the digital camera 10. The linear matrix coefficients 92 may be selected, for example, from the sRGB proposed by the Microsoft Corporation, Adobe RGB proposed by Adobe Systems Incorporated, ProPhoto RGB proposed by Eastman Kodak Company and Finepix RGB proposed by Fuji Photo Film Co., Ltd. The linear MTX circuit 76 supplies the gain adjuster 80 with image data thus corrected in a predetermined color space.

The white balance decision circuit 78 is adapted to determine whether or not the white balance gain adjusted is optimum for white balance adjustment, based on the image data 56 supplied. Here, the white balance adjustment is optimized only in the predetermined color space set in the digital camera 10. The white balance decision circuit 78 checks whether or not the white balance is in the optimum range, and outputs a white balance gain 94 in the optimum range to the gain adjuster 80. The white balance decision circuit 78 sends out the white balance gain 94 obtained to the storage 32 over the data bus 58 and interface unit 68, in order to record the white balance gain 94 in the form of color temperature information, which reflects the conditions of a captured image onto a reproduced image associated therewith.

The gain adjustment circuit 80 is adapted for adjusting the gain for the supplied image data, based on the white balance gain 94 supplied, to adjust the white balance. The gain adjuster 80 has its output supplied to the gamma corrector 82. This gamma corrector 82 has the correcting function for matching to the non-linear characteristics, and includes, e.g. a lookup table for storing gamma correction data. The gamma corrector 82 uses the data of the lookup table to correct the gradation of image data supplied from the main memory 62, thus gamma correction being accomplished. The gamma corrector 82 sends out the corrected image data to the RGB interpolator 84.

The RGB interpolator 84 has the synchronizing function of generating, by interpolation, pixel data of color attributes at the position of pixels lacking pixel data from the pixel data supplied of the existing pixels associated with the pattern of three primary color filter segments, R, G and B. With the RGB interpolator 84, the interpolation coefficients are preferably set with the color filter pattern and the spectrum sensitivity characteristics also taken into account. The RGB interpolator 84 sends out pixel data 96, 98 and 100 of the three primary colors of R, G and B thus interpolated to the YC converter 86.

The YC converter 86 has the function of generating a luminance (Y) signal 102, based on the pixel data 96, 98 and 100 of the three prime colors of R, G and B supplied, as well as a color (C) signal 104, using the pixel data 96, 98 and 100 as three stimulus values. The YC converter 86 outputs the generated luminance signal 102 to the edge enhancement circuit 88 and to the color difference MTX circuit 90, while outputting the color signal 104 to the color difference MTX circuit 90.

The edge enhancement circuit 88 has the aperture correcting function of emphasizing an edge in a picture represented by the luminance signal 102 supplied. The edge enhancement circuit 88 outputs the edge-enhanced luminance signal 106 over the data bus 58. The color difference MTX circuit 90 executes calculation, based on the luminance signal 102 and the color signal 104 supplied, to output a color difference signal 108 onto the data bus 58. This sequence of operation is carried out in the usual compression-recording mode. Accordingly, the system is adapted to supply the compander 66 with the luminance signal 106 and the color difference signal 108 are supplied over data bus 58.

The image data 56 are supplied over data bus 58 to the front end of a signal line 110 where there is provided a mode selector, not shown. The mode selector is supplied with compressed luminance and color difference signals in the usual compression recording mode, while being supplied with the raw image or pixel data 56 in the raw data mode, to select image data supplied to the signal line 110, depending on which the prevailing mode of the digital camera 10 is. Thus, the signal line 110 is supplied with image data which are in keeping with the prevailing mode.

The interface unit 68 is supplied with the image data, color temperature information 94 and the linear MTX coefficients 92 over signal line 110. In FIGS. 1B and 2, these signals are collectively represented by bus 112. The interface unit 68 has the function of controlling not only electrical level conversion attendant on inputting and outputting of various data supplied, but also the read and write operations. The write and readout control is carried out responsive to a control signal 74 supplied from the system controller 22. The interface unit 68 supervises the writing and reading out of data to and from the storage 32.

FIG. 2 shows a recording adjustment circuit 114, which is peculiar to the digital processor 64 and not provided in a image reproducing apparatus, which will be described subsequently. The recording adjuster 114 is formed by the linear MTX circuit 76, the white balance decision circuit 78 and the gain adjuster 80.

In front of the linear MTX circuit 76, an offset corrector and a shading corrector, both not shown, may be provided. The offset corrector has the function of correcting the offset contained in the image data 56, and has its output connected to the shading corrector. The shading corrector has the function of electrically correcting the shading phenomenon, caused by the lenses in the periphery thereof. The correction is accomplished by applying the characteristics which are reverse to the characteristics of the shading involved in the image.

In the rear end of the YC converter 86, a noise reducer may be provided. This noise reducer has a filtering function of reducing noise components contained in a supplied signal, and includes a low-pass filter and a median filter. The low-pass filter has the function of passing a signal component over a broad range so that no aliasing is caused in the pixel data of luminance signal and the pixel data of color signal. The median filter has the function of reducing the noise without blurring the edge in the picture.

Returning to FIGS. 1A and 1B, the compander 66 is adapted to compress picture data (Y/C) or color difference data, supplied thereto in a still or a moving picture (movie) mode, in accordance with the JPEG (Joint Photographic coding Experts Group) or the MPEG (Moving Picture coding Experts Group)-1 or -2. The compressed image data are sent from the compander 66 to the interface unit 68. The interface unit 68 has the function of not only adjusting the electrical characteristics in reading and writing a card recording medium of the storage 32 and controlling the read and write, but also adjusting the timing to output the processed image data to the storage 32. The compander 66 is also adapted to read out the image data stored in the storage 32 on the data bus 58 to expand the image data thus read out. The expansion is reverse to the compression in processing.

The display controller 70 has the function of RGB-converting the image data, obtained on expanding image data generated in the digital processor 64 or read out from the storage 32 in reproduction, and setting the RGB-converted image data to the frame size having the number of pixels that can be displayed on the screen of the monitor 30. The display controller 70 is in operation responsive to the control signal 74 supplied over control bus 72. The frame size having the pixels displayable on the monitor screen is established by thinning the image data having no defect and distortion. The display controller 70 provides the monitor 30 with the thus established image data.

The signal processor 20 may include an evaluation value calculator, not specifically illustrated. The evaluation value calculator has the function of calculating an accumulated value for use in AE, AF, shutter speed and automatic while balance (AWB) control and gradation correction. The evaluation value calculator supplies the system controller 22 with the accumulated value thus calculated as a parameter over bus 92. The signal processor 20 is supplied with a timing signal, not shown, from the timing signal generator 26. The timing signal includes a horizontal sync signal HD, a vertical sync signal VD and an operating clock signal for the various components of the camera 10.

The system controller 22 is implemented by a micro-computer or a CPU (central processing unit) adapted for controlling the elements functioning as a camera and the components responsible for digital processing of the camera 10. The system controller 22 includes, e.g. an EEPROM (electrically erasable programmable read-only memory), not shown, for storing therein a predetermined coefficient and a coefficient for scene discrimination and, a ROM (read-only memory), also not shown, for storing an instruction program sequence for the operational procedure. The system controller 22 compares, e.g. the accumulated value supplied to a predetermined reference value to generate control signals 116 and 118, depending on the results from the comparison, to output the generated signals to the timing signal generator 26 and to the driver 28.

The system controller 22 is responsive to a command signal 120, instructing the mode defined by the operating unit 24 or indicative of a trigger for operation, to set the digital camera 10 to, e.g. a still pictures shooting mode, a moving picture shooting mode, a low-sensitivity imaging mode or a high-sensitivity imaging mode, depending on the command signal 120. The system controller 22 is also advised of the imaging timing from a shutter release button, not shown, to generate control signals 74, 116 and 118 which are in keeping with the accumulated values.

The system controller 22 not only controls the signal processor 20 by the control signal 74, but also sends out the linear matrix coefficients 92 as control data to, e.g. the digital processor 64. The control signal 74 is supplied to the digital processor 64 and to the interface unit 68, as shown in FIG. 2. Particularly in the digital processor 64, the linear MTX circuit 76, white balance decision circuit 78, gain adjuster 80, gamma corrector 82, RGB interpolator 84, YC converter 86, edge enhancement circuit 88 and color difference MTX circuit 90 are controlled by the control signal 74.

The operating unit or control panel 24 includes a mode selector and a release shutter button, although not shown specifically. The mode selector selects either one of the several modes, namely the still picture shooting mode, moving picture shooting mode, low-sensitivity imaging mode and high-sensitivity imaging mode as the prevailing mode. The mode selector outputs the selected mode in the form of command signal 120 to the system controller 22.

The shutter release button has two strokes. In the first stroke, the digital camera 10 is set to a stage (S1) for preliminary imaging, while being set to the principal imaging stage (S2) in the second stroke for defining a trigger timing by a command signal 124, which will be provided to the system controller 22. The operating unit 24 may also be provided with a zoom selection switch and a cross-button, while it may also have the function of selectively designating the condition items displayed on the liquid crystal display panel.

The timing signal generator 26 includes an oscillator or signal generator (SG) for generating the operating frequency for the timing signals. The signal generator has its oscillation frequency changeable in response to the control signal 116. Preferably, the signal generator may be adapted to generate a first frequency routinely used in generating a horizontal transfer signal and a second frequency which is reduced or divided into about one-half of the first frequency.

The timing signal generator 26 generates various timing signals from the reference clock signal, not shown. The timing signals include, in addition to the horizontal transfer signal, vertical sync signal, horizontal sync signal, field shift pulse, vertical transfer signal, and electronic shutter pulse. The timing signal generator 26 also generates the CDS pulse 52 and the converter clock signal 54 to send the so generated pulses and signals to the pre-processor 18. The timing signal generator 26 supplies the driver 28 with a timing signal 122, including the vertical sync signal, horizontal sync signal, field shift pulse, vertical transfer signal, horizontal transfer signal and electronic shutter pulse, thus generated.

The driver 28 includes a drive circuit for generating drive signals 34, 36 and 44, based on the timing signal 122 and the control signal 118 supplied. The driver 28 sends the driving signals 34 and 36 to the optical lens mechanism of the optical unit 12 and to the iris diaphragm adjustment mechanism 14, in response to the control signal 118, in order to perform the AE and/or AF adjustment. The driver 28 feeds the mechanical shutter included in the iris diaphragm adjustment mechanism 14 with the drive signal 36 for use in opening and closing the mechanical shutter, responsive to the shutter release button of the operating unit 24 depressed to define the timing of the principal imaging.

The driver 28 sends the drive signal 44, generated on the basis of the timing signals 122, to the solid-state imaging device 42 of the image pickup section 16, to cause signal charges to be stored during the period of time of light exposure in the photosensitive cells. The signal charges, thus stored, are read out under the control in keeping with the aforementioned conditions. In an application in which a CCD type of image sensor is employed as the image pickup section 16, the image pickup section 16 develops the signal charges to its vertical transfer register to transfer the read-out signal charges to its horizontal transfer register in order to output analog voltage signals 46 through the horizontal transfer register and the output amplifier.

The monitor 30 is adapted to visualize picture data supplied through the display controller 70 in the form of picture. In general, as the monitor 30, a liquid crystal display may be used. The liquid crystal display includes a liquid crystal display controller. The liquid crystal display controller is adapted to control switching, in response to the image data, of applying a voltage to the liquid crystal molecules to align the latter. By this control, the liquid crystal display visualizes a picture represented by the image data. Of course, the monitor 30 is not limited specifically to the liquid crystal display but may be any suitable, e.g. small-sized display unit by which a picture can be viewed and power consumption may be reduced.

The storage 32 is implemented by, e.g. a semiconductor memory, as a recording medium, to record or store the data of the linear matrix coefficients 92 and the white balance gain 94, as the color temperature information, together with either one of image data digitally processed by the signal processor 20 or image data not digitally processed. An optical disc or a magneto-optical disc may also be used as a recording medium. The storage 32 may include a recording/reproducing head comprising a pickup or transducer compatible with a recording medium available, or a combination of a pickup and a magnetic head to allow the recording medium to store and/or develop data. data are written in and/or read out responsively to the control signal 74 supplied by the system controller 22.

Thus, the digital camera 10 is adapted to record in a recording medium linear matrix coefficients (color space conversion information) as well as image data to be recorded together with a white balance gain (white balance information), so as to allow a reproducing device to be notified of the information reflecting the white balance condition established at the time of capturing the image data.

Figure 3:
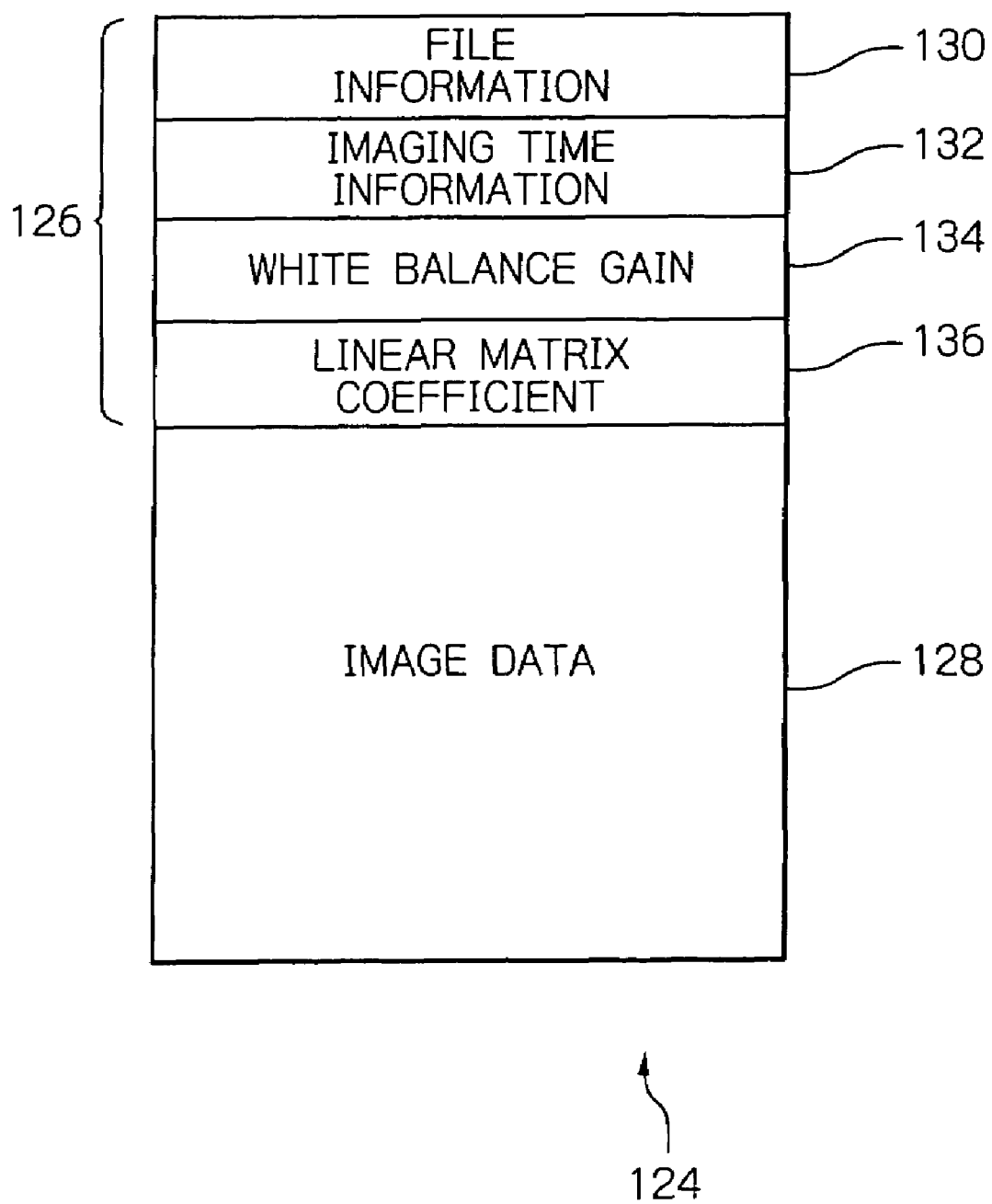
FIG. 3 is a diagram useful for understanding a format of data recorded in a storage of FIG. 1.

The storage 32 may record data in the recording format 124, as shown in FIG. 3, which includes a header area 26 and an image data area 128. The header area 126 includes a file information field 130 for storing the file number or identification of an image file in question, an imaging time information field 132 indicating the date and time of capturing an image, a white balance gain field 134 and a linear matrix information field 136. Image data appropriate for the predominant mode are supplied to and stored in the image data area 128.

Figure 4:
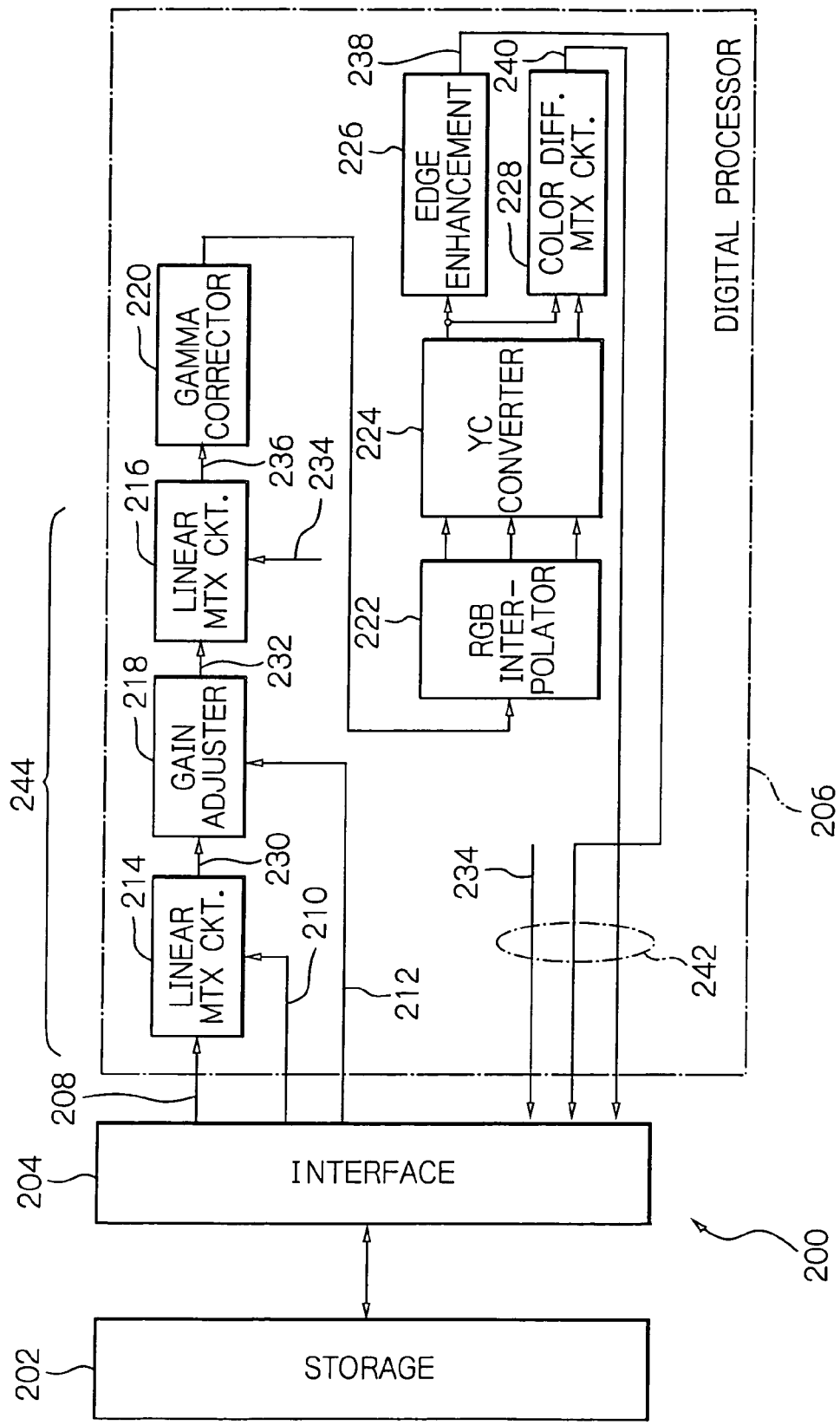
FIG. 4 is a block diagram showing the schematic configuration of a reproducing apparatus in accordance with the present invention.

Now, referring to FIG. 4, the exemplified configuration of a reproducing apparatus 200, employing the image reproducing apparatus of the present invention, will now be briefly described. The reproducing apparatus 200, shown in FIG. 4, includes a storage 202, an interface unit 204 and a digital processor 206 interconnected as illustrated. Of course, there is included a system controller, not shown, for controlling the entire operation of the reproducing apparatus 200. The storage 202 and the interface unit 204 are basically the same as the corresponding components of the digital camera 10. The same components are not described here for avoiding redundancy. The storage 202 develops data stored in the recording format 124 in the semiconductor memory serving as a recording medium, not shown, to the interface unit 204 and thence to the digital processor 206, the data including the image data 208, linear matrix coefficients 210 and white balance gain 212.

The digital processor 206 includes linear MTX circuits 214 and 216, a gain adjuster 218, a gamma corrector 220, an RGB interpolator 222, a YC converter 224, a edge enhancement circuit 226 and a color difference MTX circuit 228. On comparison to the digital processor 64 of the digital camera 10, shown in FIGS. 1A and 1B, the digital processor 206 of the reproducing apparatus 200 differs from the digital processor 64 in having two linear MTX circuits, specifically the linear MTX circuits 214 and 216, without including circuitry corresponding to the white balance decision circuit 78. The digital processor 206 is the same as the digital processor 64 in the configuration of the gamma corrector 220, RGB interpolator 222, YC converter 224, edge enhancement circuit 226 and color difference MTX circuit 228.

It is assumed that the storage 202 has a semiconductor memory loaded therein which has data stored by means of the digital camera 10, and that image data recorded in the raw data mode is to be reproduced among the image data recorded in the semiconductor memory. The linear MTX circuits 214 and 216 are provided with the matrix calculating function. The linear MTX circuit 214 is supplied with the linear matrix coefficients 210. In this case, the linear matrix coefficients 210 thus read out is the linear matrix coefficients 92 under the condition of the semiconductor memory loaded as stated above. The linear MTX circuit 214 in turn converts the image data to the RGB color space set at the time of imaging in accordance with the linear matrix coefficients 92. The converted image data 230 will be supplied to the gain adjuster 218.

The reason for providing the linear MTX circuit 214 for color space conversion is that the gain adjuster 218 following thereto has its white balance gain already set so as to adjust the white balance based on the color space set when capturing the image. The image data generated in the raw data mode do not have any color space setting taken into account at all. If the white balance were adjusted here with the white balance gain 212, then the gain adjustment ultimately achieved would only be poor in white balance, since the image data would not have the color space taken into account. In order to avoid this inconvenience, the linear MTX circuit 214 is provided for setting the color space for the image data 208 generated in the raw data mode.

The gain adjuster 218 is supplied with the white balance gain, valid when capturing an image, which was read out from the semiconductor memory. The gain adjuster 218 is adapted to adjust the gain of the image data 230 with the white balance gain 212 valid at the time of imaging. The provision of the linear MTX circuit 214 and the gain adjuster 218 permits the successive processing carried out so far to conform the image data to the color space valid at the time of imaging to enable the white balance to be adjusted in optimum for the image data in question. The gain adjuster 218 sends image data 232, optimally adjusted in white balance, to the linear MTX circuit 216.

This linear MTX circuit 216 has the function of conversion to a color space desired by the user on the reproducing apparatus 200. Thus, the linear MTX circuit 216 is supplied with linear matrix coefficients 234 for use in conversion to a desired color space. Since this color space control is carried out after the white balance has been adjusted to its optimum condition, its unlikely that the white balance may be distorted. The linear MTX circuit 216 outputs the image data 236, corrected to a desired color space, to the gamma corrector 220.

The processing by the gamma corrector 220, RGB interpolator 222, YC converter 224, edge enhancement circuit 226 and color difference MTX circuit 228 is the same as that of the corresponding components of the digital camera 10 already described. The edge enhancement circuit 226 delivers an edge-enhanced luminance signal 238 to the interface unit 204, while the color difference MTX circuit 228 does a generated color difference signal 240 to the interface unit 204. The interface unit 204 is provided with data 242 which include the image data corrected to a desired color space by the user and the linear matrix coefficients 234. The interface unit 204 sends and stores the data 242 in the semiconductor memory of the storage 202. It is therefore preferable, when storing the data, to store desired linear matrix coefficients 234 into the linear matrix coefficients field in the header area 126 of the recording format. The processing carried out in the reproducing apparatus 200 may be defined and executed by a software program to obtain an image free from white balance offset. Additionally, the linear matrix conversion and white balance adjustment may be carried out on the image data in the raw data mode based on the setting, and followed by the conversion to a desired color space to obtain an image free from white balance offset.

From the viewpoint of the circuit configuration, circuitry peculiar to the reproducing apparatus 200 is a reproduction adjustment circuit 244, which includes the linear MTX circuits 214 and 216, and the gain adjuster 218.

In the above-stated system, when image data in the raw data mode are to be reproduced, the image data are processed so as not to set off the white balance, followed by the conversion to a desired color space. Therefore, even when the image data are corrected in terms of the color space, i.e. linear matrix, it is possible to reproduce the desired image with the optimum white balance maintained.

Figure 5:
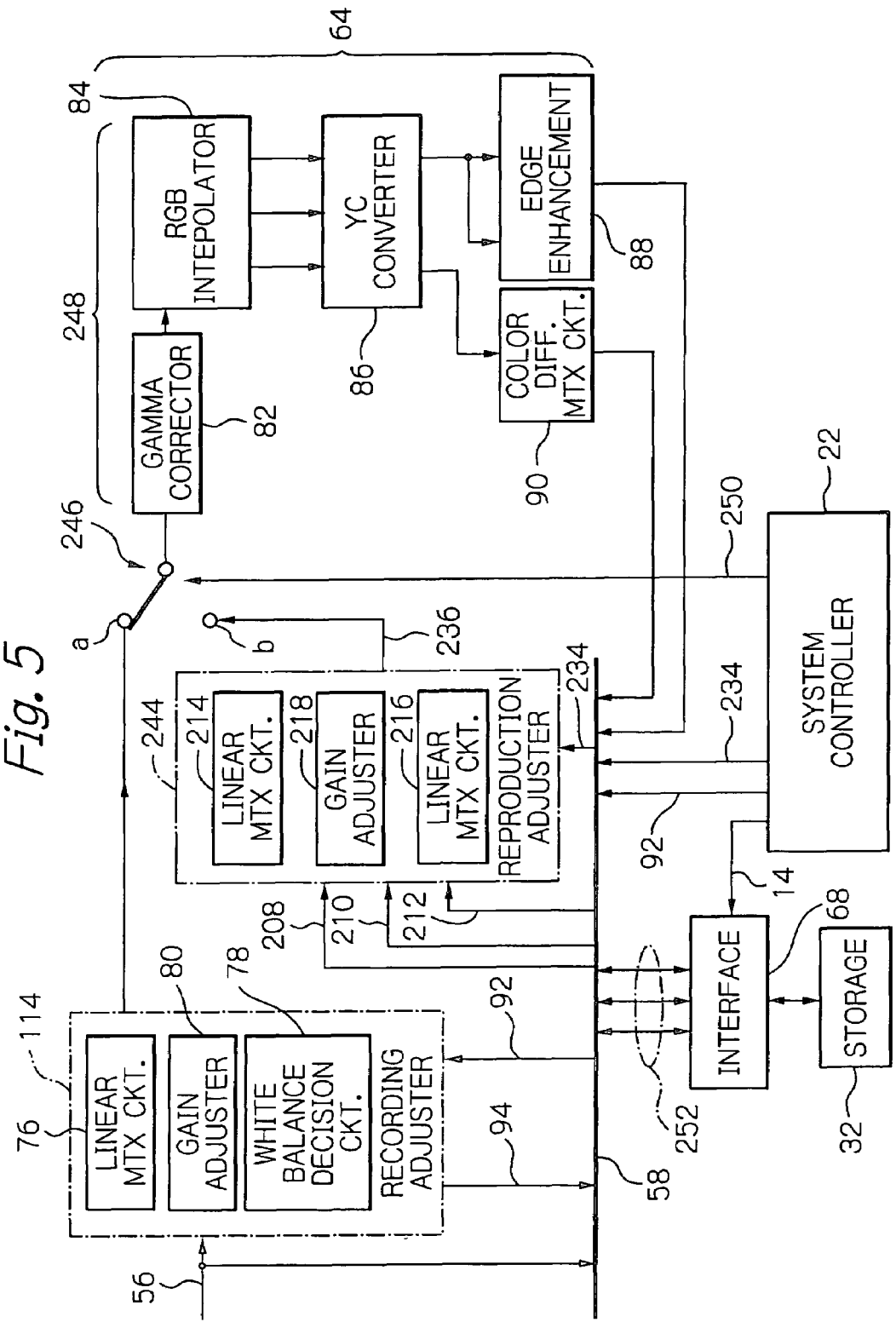
FIG. 5 is a schematic block diagram showing a preferred configuration having the function of the digital processor shown in FIGS. 1 and 4 and associated with image recording.

FIG. 5 shows a configuration in which the digital processor 64 further includes the function of the reproducing apparatus 200. The common parts or components are designated with the same reference numerals and are not described. The digital processor 64 shown in FIG. 5 includes the recording adjustment circuit 114, accomplishing the imaging processing shown in and described with reference to FIG. 2, a reproduction adjustment circuit 244, accomplishing the reproducing processing shown in and described with reference to FIG. 4, a recording/reproduction selector switch 246 and a processing circuit 248 common to recording and reproduction, which are interconnected as illustrated.

The selector switch 246 is provided to select either recording or reproduction in the usual mode. The selector switch 246 has its terminal a connected to an output terminal from the recording adjuster 114, while having its terminal b connected to an output terminal from the reproduction adjuster 244, in such a manner as to select the terminal a or b, acting as the source port, in response to a switching control signal 250 supplied from the system controller 22. The switching control signal 250 is generated in response to a command signal 120 supplied to the system controller 22, which determines the selection of the user between recording and reproduction on the operating unit 24.

The common processor 248 includes a gamma corrector 82, an RGB interpolator 84, a YC converter 86, an edge enhancement circuit 88 and a color difference MTX circuit 90 interconnected as illustrated. The edge enhancement circuit 88 and the color difference MTX circuit 90 send the luminance signal and the color difference signal on the data bus 58. This enables the circuit to be simplified in configuration. The interface unit 68 is responsive to the control signal 74 to control the read and write of the data 252 from and to the storage 32.

The operation of the digital processor 64 will be now briefly described. In the raw data mode, data 252 to be read out and written in include the image data 56, the white balance gain 94, output from the recording adjuster 114 as the color temperature information, and the linear matrix coefficients 92, supplied from the system controller 22. These three pieces of data are stored via interface unit 68 in the storage 32.

In the usual compression mode, the image data 56 are transformed into the luminance and color difference signals through the recording adjuster 114, the terminal a of the selector switch 246 and the common processor 248. This causes the luminance signal, color difference signal and white balance gain 94 to be supplied as data 252 to the interface unit 68.

In reproducing image data recorded in the raw data mode, the data 252 include the raw image or pixel data 208, white balance gain 212 and linear matrix coefficients 210. In particular, in view of the relationship of recording to reproduction, the data 252 correspond to the raw image data 56, white balance gain 94 and linear matrix coefficients 92. In reproduction, when the user wishes the conversion to a desired color space, he or she may set an optional color space in advance by means of, e.g. the operating unit 24. Responsive to this setting, the system controller 22 provides the reproduction adjuster 244 with the linear matrix coefficients 234 for conversion to a desired color space over data bus 58.

The reproduction adjuster 244 outputs the image data 236, converted to a desired color space, to the terminal b of the selector switch 246. Since the selector switch 246 has now its movable contact connected to its terminal b during reproduction, the image data 236, supplied to the common processor 248, are converted to luminance and color difference signals. In this case, the luminance and color difference signals are transferred over data bus 58 and recorded in the storage 32 as in the usual recording mode. The white balance gain and the linear matrix coefficients 234 set by the user are recorded in the storage 32 in accordance with the recording format.

In this manner, also with the digital camera 10 provided with the recording and reproducing functions, the white balance adjustment and the color space conversion make it possible to suppress the inconvenience, e.g. white balance offset, attendant on forming an image. In particular, by recording for suppressing the offset in the raw data mode and exploiting the information recorded effectively in reproducing the image, the conversion to a desired color space hardly causes a white balance offset in processing to reproduce and record a satisfactory image.

In the above configuration, the raw data 56, white balance gain 94 and linear matrix coefficients 92 recorded in the raw data mode appreciably contribute to preventing the white balance from being set off during reproducing image data.

In reproduction, data recorded in the raw data mode are read out in the form of raw pixel data 208, which are in turn converted with the linear matrix coefficients 210 into image data 230 in conformity with the color space setting at the time of imaging. The data 230 are adjusted in gain with the white balance gain 212 read out to be adjusted in white balance and corrected to a color space desired by the user with the linear matrix coefficients 234. The image data corrected to the desired color space may be made less susceptible to the offset of the white balance to enable a satisfactory image to be produced.

Moreover, the digital processor 64 of the digital camera 10 records, in the raw data mode, not only the raw image data 56 and the white balance gain 94 but also the linear matrix coefficients 92, and, during reproduction, the linear matrix coefficients 92 and the white balance gain 94 are applied in sequence to the raw image data to there by adjust the white balance in the color space valid at the time of imaging, followed by conversion to a color space desired by the user. This causes the image to be corrected to the desired color space with less susceptibility to the offset of the white balance, thus enabling a satisfactory image to be produced to provide an easy-to-use system.

The entire disclosure of Japanese patent application No. 2003-108139 filed on Apr. 11, 2003 including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and sprit of the present invention.

What is claimed is:

1. A digital processor for recording adjustment and reproducing image data formed by imaging an object, said processor comprising:
a recording adjustment circuit for adjusting color temperature in the image data, based on the image data, determining whether adjustment of the color temperature is optimum;
a reproduction adjustment circuit for converting the image data to a desired color space based on:
a first color space information;
the color temperature information optimum for the first color space information;
a second color space information, in order;
a recording/reproduction selector switch to select either recording or reproduction in a usual mode; and
a common processor for commonly processing the image data from the recording adjustment circuit and the reproduction circuit,
wherein the first color space information includes a standard prescription for a color space proposed by a manufacturer, and the second color space information defines a color space desired by a user of said processor.

2. The digital processor in accordance with claim 1, wherein a switching control signal is generated in response to a command signal supplied to a system controller, which determines selection of a user by the recording/reproduction selector switch.

3. The digital processor in accordance with claim 1, wherein the reproduction adjustment circuit outputs the image data, converted to a desired color space, to the common processor through said selector switch, and
wherein the common processor converts the image data to luminance and color difference signals.

4. An apparatus for reproducing image data formed by imaging an object, said apparatus comprising:
a reader circuit for reading out image data, first color space information represented by a plurality of coefficients converting the image data in a color space set when imaging the object, and color temperature information optimum for the first color space information;
a first color space corrector for correcting the image data based on the first color space information;
a color temperature adjuster for correcting the image data corrected by said first color space corrector based on the color temperature information optimum for the first color space information; and
a second color space corrector for correcting the image data adjusted by said color temperature adjuster based on second color space information represented by a plurality of coefficients converting the image data to a color space set in said apparatus,
wherein the reader circuit reads out the image data in a form of raw pixel data, and
wherein the first color space information includes a standard prescription for a color space proposed by a manufacturer, and the second color space information defines a color space desired by a user of said apparatus.

5. The apparatus in accordance with claim 4, wherein the first color space information includes a standard prescription for a color space proposed by a manufacturer, and the second color space information defines a color space desired by a user of said apparatus.

6. The apparatus in accordance with claim 4, wherein the reader circuit reads out the image data from a digital processor of a digital camera recorder.

7. The apparatus in accordance with claim 6, wherein the recorder records the color temperature information and said first color space information.

8. The apparatus in accordance with claim 4, wherein the color temperature information comprises white balance information.

9. The apparatus in accordance with claim 4, wherein the second color space information and the color temperature information are recorded in a storage in accordance with a recording format of the image data.

10. The apparatus in accordance with claim 4, wherein the second color space information is set by a user.

11. The apparatus in accordance with claim 4, further comprising an adjustment decision circuit for adjusting color temperature in the image data, based on the image data, determines whether adjustment of the color temperature is optimum.

12. The apparatus in accordance with claim 4, further comprising:
a gain adjuster; and
a recording adjustment circuit,
wherein said color temperature adjuster uses the gain adjuster for correcting the image data corrected by the first color space corrector based on gain adjustment information output from the recording adjustment circuit.

13. A solid-state imaging apparatus, comprising:
an image pickup device including an array of photosensitive cells for transducing incident light from an object field into an electrical image signal;
said apparatus having a raw data mode for recording the image signal in a form of digitized, raw image data;
an adjustment decision circuit for adjusting color temperature in the image data, based on the image data, determining whether or not adjustment of the color temperature is optimum for first color space information, and outputting gain adjustment information reflecting the color temperature resultant from determination;
a recording adjuster for adjusting the raw image data based on second color space information including a plurality of coefficients for converting the raw image data to a color space used in imaging the object field and the gain adjustment information to a predetermined recording form; and
a system controller for controlling said adjustment decision circuit and said recording adjuster,
wherein the first color space information includes a standard prescription for a color space proposed by a manufacturer, and the second color space information defines a color space desired by a user of said apparatus.

14. The apparatus in accordance with claim 13, further comprising:
a color space corrector for correcting the image data in accordance with the color space information of the color space used in imaging the object field; and
a gain adjuster for correcting the image data corrected by said color space corrector based on the gain adjustment information output from said adjustment decision circuit.

15. A digital camera wherein incident light from an object field is transduced by an image pickup device including an array of photosensitive cells into an electrical image signal, and in a raw data mode the image signal is recorded in a form of digitized, raw image data, said digital camera comprising:
an adjustment decision circuit for adjusting color temperature in the image data, based on the image data, determining whether or not adjustment of the color temperature is optimum, and outputting gain adjustment information reflecting the color temperature resultant from determination;

a writer/reader for adjusting the raw image data as well as first color space information including a plurality of coefficients for converting the raw image data to a color space used in imaging the object field and the gain adjustment information to a predetermined recording form, and for recording and reproducing the raw image data, the first color space information and the gain adjustment information;

a first color space corrector for correcting the image data based on the first color space information;

a color temperature adjuster for adjusting the image data corrected by said first color space corrector based on the gain adjustment information;

a second color space corrector for correcting the image data adjusted by said color temperature adjuster based on second color space information represented by a plurality of coefficients converting the image data to a color space set in said digital camera; and a system controller for controlling said adjustment decision circuit, said writer/reader, said color temperature adjuster and said first and second color space correctors, wherein the first color space information includes a standard prescription for a color space proposed by a manufacturer, and the second color space information defines a color space desired by a user of said digital camera.

16. The digital camera in accordance with claim 15, wherein the first color space information includes a standard prescription for a color space proposed by a manufacturer for imaging the object field, and the second color space information defines a color space desired by a user of said digital camera.

17. The digital camera in accordance with claim 16, wherein said first color space corrector uses a linear corrector for correcting the image data in accordance with the first color space information used in imaging the object field;

said color temperature adjuster using a gain adjuster for correcting the image data corrected by said first color space corrector based on the gain adjustment information output from said adjustment decision circuit.

18. The digital camera in accordance with claim 15, wherein said first color space corrector uses a linear corrector for correcting the image data in accordance with the first color space information used in imaging the object field;

said color temperature adjuster using a gain adjuster for correcting the image data corrected by said first color space corrector based on the gain adjustment information output from said adjustment decision circuit.

* * * * *